(12) United States Patent  
Hsu

(10) Patent No.: US 7,955,642 B2
(45) Date of Patent: *Jun. 7, 2011

(54) LAYERED LENSES AND METHOD OF LAYERING LENSES

(76) Inventor: Roger Hsu, Rancho Cucamonga, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/274,543

(22) Filed: Nov. 20, 2008

(65) Prior Publication Data

US 2009/0081378 A1    Mar. 26, 2009

Related U.S. Application Data

(63) Continuation-in-part of application No. 11/644,519, filed on Dec. 22, 2006, now Pat. No. 7,811,628.

(51) Int. Cl.
*B05D 5/06* (2006.01)
(52) U.S. Cl. ....................................................... 427/164
(58) Field of Classification Search .................... 427/162
See application file for complete search history.

(56) References Cited

U.S. PATENT DOCUMENTS

| 4,673,609 A * | 6/1987 | Hill ................................ 428/187 |
| 4,812,031 A | 3/1989 | Evans |
| 4,955,709 A | 9/1990 | Smith |
| 5,073,009 A | 12/1991 | Tovi |
| 5,099,360 A | 3/1992 | Tovi |
| 5,521,655 A * | 5/1996 | Rhoad ............................. 351/51 |
| 5,668,618 A | 9/1997 | Simioni |
| 5,767,933 A | 6/1998 | Hagan |
| 5,858,155 A | 1/1999 | Hill et al. |
| 6,415,452 B1 | 7/2002 | Watanabe et al. |
| 6,565,948 B1 | 5/2003 | Lin et al. |
| 6,811,259 B2 | 11/2004 | Tucker et al. |
| 6,824,639 B1 | 11/2004 | Hill et al. |
| 6,899,426 B2 | 5/2005 | Tucke et al. |
| 6,902,274 B2 | 6/2005 | Tucker et al. |
| 7,011,408 B2 | 3/2006 | Tucker et al. |
| 7,250,197 B2 | 7/2007 | Rastogi et al. |
| 2001/0050753 A1 | 12/2001 | Tucker et al. |
| 2003/0184710 A1 | 10/2003 | Tucker et al. |
| 2006/0051501 A1 * | 3/2006 | Conte et al. ................... 427/162 |

FOREIGN PATENT DOCUMENTS

| JP | A-06-347728 | 12/1994 |
| JP | U-3066075 | 11/1999 |
| JP | U-3082263 | 9/2001 |

* cited by examiner

*Primary Examiner* — Timothy H Meeks
*Assistant Examiner* — Elizabeth Burkhart
(74) *Attorney, Agent, or Firm* — Alexander Chen, Esq.

(57) ABSTRACT

A method for layering lenses includes: plasma treating a lens surface; applying a removable ink layer onto the lens surface; applying a base ink layer over the removable ink layer; applying at least one colored ink layer over the base ink layer; and removing the removable ink layer. Additional steps may include drying the lens, sealing the sides of the lens, and applying liquid to the lens before removing the removable ink layer.

2 Claims, 3 Drawing Sheets

LAYERED LENSES AND METHOD OF LAYERING LENSES

CROSS-REFERENCE TO RELATED APPLICATIONS "

This application is a Continuation In Part (CIP) of U.S. utility patent application Ser. No. 11/644,519 filed on Dec. 22, 2006, now issued U.S. Pat. No. 7,811,628, the disclosures of which are incorporated herein by reference".

FIELD OF THE INVENTION

This invention is generally related to eyeglass lenses, and more particularly to layered lenses and a method of layering lenses with pictures or patterns so as to make a polarized camouflage eyeglasses

BACKGROUND OF THE INVENTION

Eyeglasses, sunglasses and goggles on the market today may have pictures, camouflage, vacuum colored mirror coatings with pictures, or other patterns printed on the lenses. Inkjet printers and laser printers can be used to print a picture on a lens, but these and other existing methods of putting a picture on a lens have limitations. Prior methods print on a flat surface, and on materials configured to withstand high temperatures such as polycarbonate and very thin plastic (generally where the thickness is less than 1.1 mm). It is difficult or impossible to print on laminated or polarized lenses due to the excess heat required to cure the ink. Such high temperature processing may change the color of the lens, create cracks in the lens, and possibly damage the lamination or polarization coating of the lens.

It is therefore an object of the invention to provide a method of layering lenses with pictures, camouflage, or other patterns, which avoids the problems associated with current printing processes so as to make a polarized camouflage eyeglasses.

SUMMARY OF THE INVENTION

A method for making polarized camouflage eyeglasses may include: plasma treating a lens; applying a removable ink layer to create a mesh-like pattern of clear and shaded areas; applying at least one base ink layer over the clear areas; applying at least one colored ink layer over a base ink layer; and removing the removable ink layer to reveal a lens with a see-through lens with an image projected thereon.

The plasma treating may be performed on the outer surface of the lens and may include cleaning and functionalizing in a vacuum chamber or in an open environment. The lens may be a plastic lens selected from the group consisting of: polycarbonate, tri-acetyl cellulose (TAC), and cellulose acetate butyrate (CAB). The lens may also be a sunglass lens, may be polarized, may be hard coated, and may be shaped in curved and flat forms. A matte finish may be applied to the lens to prevent reflection. An anti-reflective vacuum coating may also be applied to a lens to prevent reflection. In one instance, the lens may be a curved, polycarbonate, polarized lens having a functionalized outer surface, and a series of ink layers applied to the outer surface. The lens may also be use in connection with goggles.

A removable ink layer may be urethane-based and may be applied onto the lens by silk-screening or pad printing to form a mask having a mesh pattern with clear and shaded areas. The base ink layer may be water-based, oil-based, and black or white or other suitable color and may be silk screened or pad printed over the removable ink layer to cover at least a portion of the clear areas within the removable ink layer. The base ink layers may include one or more layers. For example, a first dark-colored base ink layer may be covered by second light-colored base ink layer cover. Four colored ink layers may be applied over the base ink layer to form an image; the four colored ink layers may include a cyan layer, a magenta layer, a yellow layer, and a black layer. The image created on the lens may be a camouflage pattern. At least one of the colored ink layers may be silk-screened or pad printed over the base ink layer. After the colored ink layers are applied, the ink may be dried by a blow dryer or left to air dry. The sides of the lens may also be sealed with tape for further processing. Water may then be applied to the lens to remove or assist in removing the removable ink layer. In removing the removable ink layer, a scrubbing process may be used in connection with the application of water. The water may be used to soften the removable ink layer. The removable ink layer may also be peeled from the lens surface.

BRIEF DESCRIPTION OF THE DRAWINGS

The invention is generally shown by way of reference to the accompanying drawings in which.

DETAILED DESCRIPTION OF THE INVENTION

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

Figure 1:
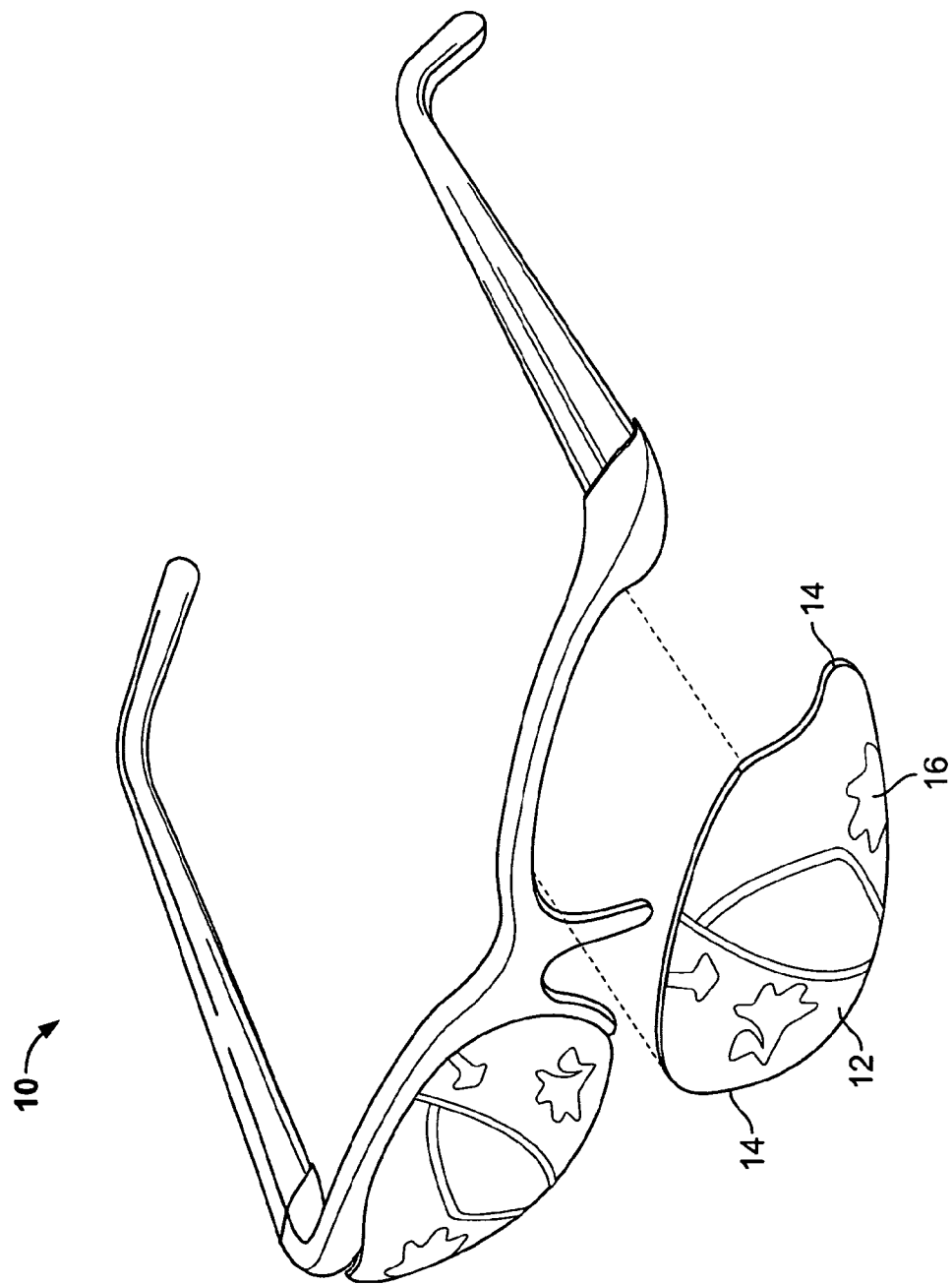
FIG. 1 is a perspective view of sunglasses having curved, polarized, polycarbonate lenses with a pattern projected onto the outer surface of the lenses.

FIG. 1 depicts eyeglasses 10 having lenses 12 with sides 14 and with a pattern 16 on the outside surface of the lenses. In this embodiment, a camouflage pattern is projected on a curved, polarized, polycarbonate sunglass lens. In other embodiments, the lens made be made of other materials including, but not limited to, unpolarized polycarbonate, triacetate cellulose (TAC), TAC polarized laminate, cellulose acetate butyrate (CAB), CAB polarized laminate, and other suitable materials. In other embodiments, the lens can also be flat, and be used in connection with prescription glasses. In other embodiments, the lens can be configured for use in connection with goggles. Since the process to prepare the lens does not require high temperatures, the lens may be made of non-heat-resistant materials and the lens may be polarized.

Figure 2:
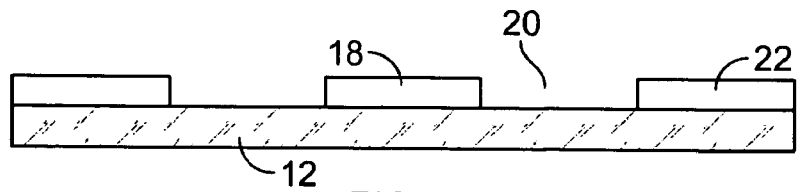
FIG. 2 is a partial side view of a curved, polarized, polycarbonate sunglass lens having a removable ink layer applied onto an outer surface of the lens, the removable ink layer forming a mask with clear and shaded areas.
Figure 3:
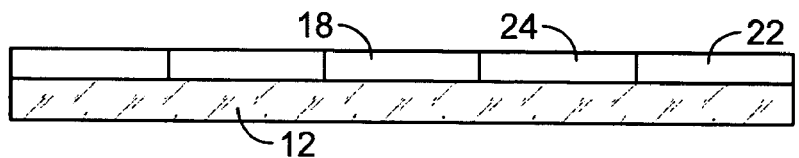
FIG. 3 is a partial side view of a curved, polarized, polycarbonate sunglass lens having a base ink layer applied onto an outer surface of the lens, filling at least a portion of the previously clear areas within the removable ink layer.
Figure 4:
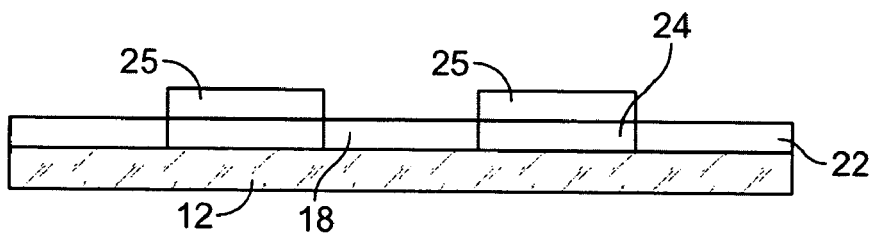
FIG. 4 is a partial side view of a curved, polarized, polycarbonate sunglass lens having a second base ink layer applied over the first base ink layer.
Figure 5:
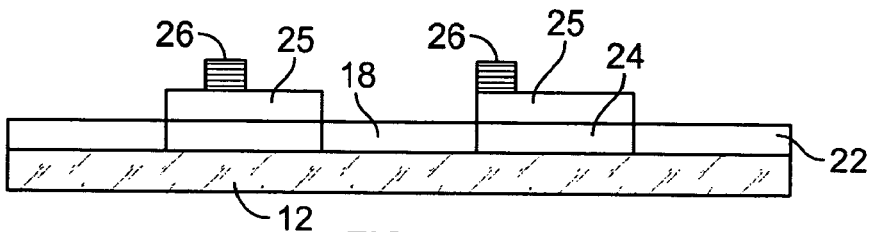
FIG. 5 is a partial side view of a curved, polarized, polycarbonate sunglass lens having a layer of cyan ink applied over the base ink layer.
Figure 6:
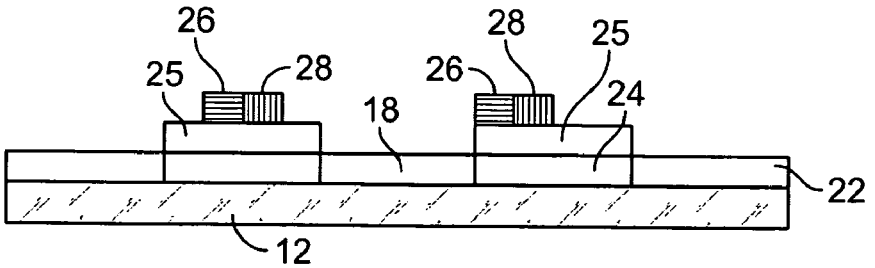
FIG. 6 is a partial side view of a curved, polarized, polycarbonate sunglass lens having a layer of magenta ink applied over the base ink layer.
Figure 7:
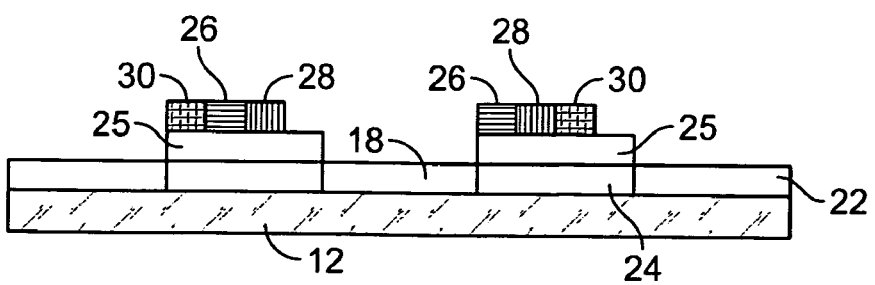
FIG. 7 is a partial side view of a curved, polarized, polycarbonate sunglass lens having a layer of yellow ink applied over the base ink layer.
Figure 8:
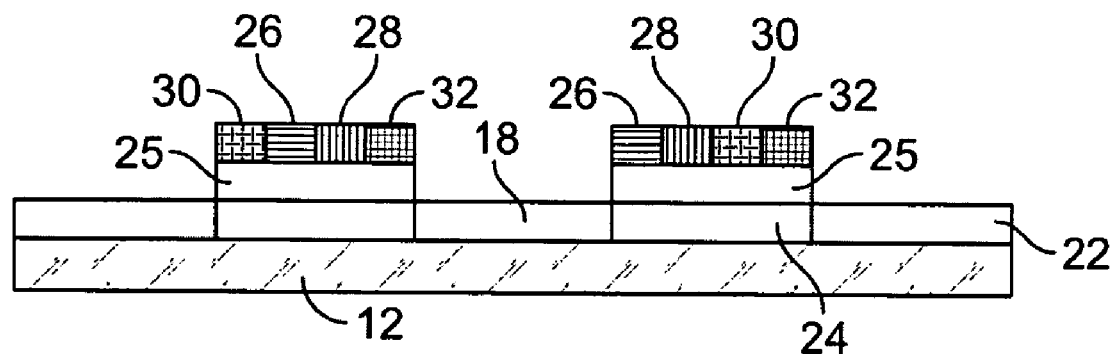
FIG. 8 is a partial side view of a curved, polarized, polycarbonate sunglass lens having a layer of black ink applied over the base ink layer.
Figure 9:
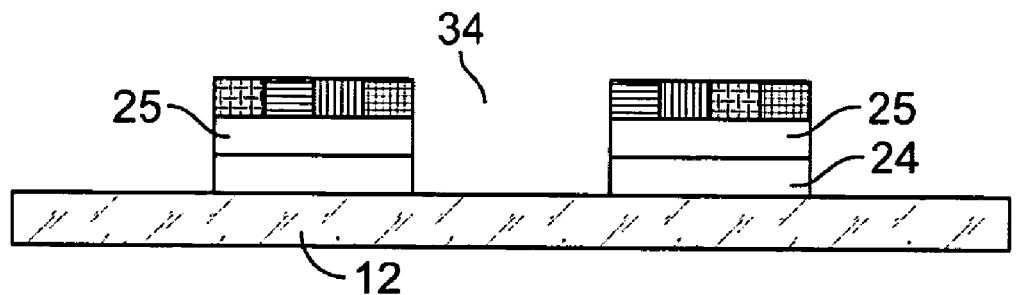
FIG. 9 is a partial side view of a curved, polarized, polycarbonate sunglass lens after the removable ink layer has been removed.

In this embodiment, the steps taken to prepare the lens 12 with a pattern 16 as shown in FIG. 1 are: plasma treating the outer lens surface; applying a removable ink layer 18 onto the plasma treated lens surface as shown in FIG. 2, where the removable ink layer forms a mesh-like mask with clear 20 and shaded areas 22; applying a base ink layer 24 over the removable ink layer corresponding to at least a portion of the clear areas of the removable ink layer as shown in FIG. 3; optional layer of removable ink 24 can be applied as shown in FIG. 4; applying four colored ink layers, cyan 26, magenta 28, yellow 30, and black 32 over the base ink layer as shown in FIGS. 5, 6, 7 and 8 respectively; and then removing the removable ink layer as shown in FIG. 9 to reveal see through with openings therein 34 with the camouflage images projected thereon.

In this embodiment, the plasma treatment is used to clean and functionalize the outer lens surface. This plasma treatment generally makes the surface clean and even, with small pores, for good contact surface. The plasma treatment is used so that the ink will adhere to the lens without the need for excessive heating which may damage certain type of lenses. In this embodiment, the treatment is performed in a vacuum chamber, similar to the plasma treating used in the manufacture of semiconductors. In other embodiments, it is possible to perform the plasma treatment at other pressures including in an open environment. In other embodiments, other surfaces of the lens, including the inner surface may also be plasma treated.

After plasma treating, a removable ink layer 18 is silk-screened onto the outer surface of the lens 12 through silk-screening. The silk-screening process includes placing a screen over the lens surface and coating the screen with ink. The ink flows through openings in the screen to the lens surface to form the removable ink layer. The first screen is then removed to reveal a mask having a mesh-like pattern with clear 20 and shaded 22 areas. The clear areas will later be filled with additional layers of ink to form images on the lens. After the later-applied ink is dried, the removable ink layer will be removed. Removal leaves the lens with a pattern of clear and shaded areas corresponding to a negative of the clear and shaded areas formed by the removable ink layer. Accordingly, the once shaded areas of the lens will be clear, permitting vision through these areas, while the once clear areas of the mask are filled with the later-applied ink. Although a mesh pattern is formed on the lens in this embodiment, in other embodiments, other patterns may be formed on the lens as desired.

While silk-screening is used to apply the removable ink layer 18 in this embodiment, other methods of application, including, but not limited to, pad printing, may be used to accomplish the same or similar objectives. Pad printing in particular may be useful for curved or thick lenses. In pad printing, a pattern is first etched into a pad. The shape of the pad may correspond to the surface of ink application, in this case a curved lens. In application, the pad is pressed against an ink reservoir, the pattern in the pad acting as a transfer reservoir for the ink. The pad is then pressed against the lens surface to transfer the image, in this case, the mesh pattern with clear and shaded areas.

The removable ink layer 18 is formed from ink having mildly adhesive properties. The mild adherence of the ink to the lens permits the removable ink layer to adhere to the lens 12 when additional layers of ink are applied to the lens, yet be removable at or near the final stage of processing. Urethane is used in the removable ink layer to rubberize the material and to make it easier to peel off the lens. While urethane is used in this embodiment, in other embodiments, other materials may be incorporated into this layer to provide the mask with similar properties. After application, the removable ink layer is dried with the application of mild heat to avoid smudging and undesired combination with subsequent ink layers. In other embodiments, the degree of heat may be varied so long as the lens lamination or polarization is not damaged. In still further embodiments, the ink may be allowed to air dry.

After application and drying of the removable ink layer 18, a base ink layer 24 is silk-screened over the removable ink layer. Similar to the silk-screen application of the removable ink layer, a screen, in this instance a second screen, is placed over the lens 12. The base layer ink is then applied to the second screen, passing through openings in this screen. However, the openings in this second screen substantially correspond to the clear areas 20 of the removable ink layer. Therefore, the base layer ink is for the most part applied directly over the bare lens surface rather than over the removable ink layer. More particularly, the base ink layer flows onto the clear areas of the lens surface not covered by the removable ink layer. To ensure that the base layer substantially occupies the clear areas of the removable ink layer, the openings within the second screen are substantially aligned with the clear areas of the removable ink layer. This arrangement provides substantially complete coverage and the second screen may be sized to account for slight misalignment on the lens. After the base layer ink has passed through the second screen and onto the lens, the second screen is removed. While silk-screening is described in this embodiment, other methods of base layer application may include, but are not limited to, pad printing. After application, the first base ink layer is dried with mild heat to avoid smudging and undesired combination with subsequent ink layers. In other embodiments, the degree of heat may be varied so long as the lens lamination or polarization is not damaged. In still further embodiments, the ink may be allowed to air dry.

After application and drying of the first base ink layer 24, a second base ink material layer 25 is layered over the first base ink layer through silk-screening. Similar to the silk screen application of the first base ink layer, a screen, in this instance a third screen, passing though openings in the screen. Like the application of the first base ink layer, the opening in this third screen substantially correspond to the previously clear areas 20 of the removable ink layer. To ensure that the second base ink layer substantially occupies the previously clear areas of the removable ink layer, the openings within the third screens, like the second screen, are substantially aligned with the previously clear areas of the removable ink layer. This arrangement provides substantially complete coverage and the third screen may be sized to account for slight misalignment ton the lens. After the second base layer ink has passed through the third screen and onto the lens, the third screen is removed. While silk-screening is described in this embodiment, other methods of second base ink layer application may include, but are not limited to, pad printing. After application, the second base ink layer is dried with mild heat to avoid smudging and undesired combination with subsequent ink layers. In other embodiments, the degrees of heat may be varied so long as the lens lamination or polarizations is not damaged. In still further embodiments, the ink may be allowed to air dry.

The base layer ink 24 in this embodiment is matte black, while the second base ink layer is 25, but in other embodiments may include other colors including, but not limited to, other shades of black, white, and other suitable colors. The base layer acts as a primer to provide a smooth and suitable backing for later application of colored layers. In this particular embodiment, the base layer is formed from water-based ink, while in other embodiments, the base layer may be formed from other types of ink including, but not limited to, oil-based ink. After application, the base ink layer is dried with the application of mild heat to avoid smudging and undesired combination with subsequent ink layers. In other embodiments, the degree of heat may be varied so long as the lens lamination or polarization is not damaged. In still further embodiments, the ink may be allowed to air dry.

The second base ink layer 25 acts as a primer to provide a smooth and suitable backing for later application of colored ink layers. In this particular embodiment, the two base layers are formed from water-based ink, while in other embodiments, one or both of the base layers are formed from other types of ink including, but not limited to, oil based ink. In still other embodiments, a base ink layer may include more than two layers or only on layer. In the case of one layer, the base ink layer may be formed from one color including, but not limited to, black, white, and other subtitle colors. Because there will only be one layer, this base ink layer will act as a primer to provide a smooth and suitable backing for later application of colored ink layers.

After application and drying of the base ink layer 24, a series of colored ink layers 26, 28, 30, 32 are applied over the base ink layer. Similar to the silk-screen application of the removable ink 18 and base ink layers, a screen, in this instance a third screen, is placed over the lens 12 for application of the first colored ink layer 26. The first colored ink layer is then applied to the third screen, passing through openings in this screen. As with the second screen, the openings in this third screen correspond to the previously clear areas 20 of the removable ink layer. Therefore, the first colored ink layer is applied over the base layer rather than over the removable ink layer. More particularly, the base ink layer flows onto the areas of the lens surface covered by the base ink layer. However, depending on the image to be projected onto the lens, the openings within the screen are varied to account for the first color. The first colored layer will therefore occupy at least a portion of a previously clear area of the removable ink layer. While silk screening is described in this embodiment, other methods of colored ink layer application may include, but are not limited to, pad printing.

The above-mentioned colored ink application process is performed in four stages corresponding to the application of each of the colors, cyan, magenta, yellow and black (CMYK). The resultant combination of colored ink layers 26, 28, 30, 32 forms a camouflage pattern on the lens. To achieve the correct image, the screens used in connection with the applications of the colored ink layers have varied openings therein corresponding to the correct amount and location of ink to be applied at each stage. Between applications of the colored ink layers, the ink is dried with the application of mild heat. In other embodiments, less than four color stages may be used, the screens may be varied to produce other images, and the degree of heat between stages may be varied so long as the lens lamination or polarization is not damaged. In still further embodiments, the ink may be allowed to air dry between color applications.

FIGS. 5-8 show cyan ink 26, magenta ink 28, yellow ink 30 and black ink 32 added over the second base ink layer 25. The colored ink layers are aligned in a mesh-like pattern with the base ink layer. After the colored ink layers are dried, the removable ink layer 18 is removed. The removable ink layer may be peeled or scrubbed away from the surface of lens 12. Any overlap of the base ink or colored layers with the previously shaded areas of the removable ink layer is eliminated once the removable ink layer is removed. FIG. 9 shows the lens with the removable ink layer removed from the lens. After removal, the previously shaded areas 22 of the removable ink layer become clear area 34 and permit vision through the lens.

Since the entire process can be performed at relatively low temperatures and works without using rollers, the ink is less likely to lose its adhesive properties and separate. The printing process is substantially clean because of the protective removable ink layer 18, and ink is less likely to spill or stain because the removable ink layer is removed once all printing processes are completed.

In other embodiments, additional steps may be performed before the removable ink layer 18 is removed. After all the ink is applied, the lens 12 may be dried, by the air, from blow-drying, or by other processes. The sides 16 (see FIG. 1) around the perimeter of lens may be sealed, possibly with tape, and a liquid such as water is applied to the surface of the lens to assist in removing the removable ink layer by softening the layer. In further embodiments, additional steps are performed either before or after the removable ink layer is removed. A matte finish can be added to the lens surface to prevent reflection. Anti-reflective vacuum coating can also be added to either the inner or outer surface of the lens. The lens then can be attached to a fixed or support frame where the fixed or support frame is an eyeglasses frame (see FIG. 1).

While several embodiments have been described in detail, it should be appreciated that various modifications and/or variations may be made without departing from the scope or spirit of the invention. In this regard it is important to note that practicing the invention is not limited to the applications described herein above. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein above. Thus, it is intended that the invention cover all such embodiments and variations as long as such embodiments and variations come within the appended claims and its equivalents.

What is claimed is:

1. A method for making camouflage eyeglasses comprising:
 plasma treating at least one lens surface, the lens having inner and outer surfaces as well as sides;
 applying a removable ink layer over at least a portion of the plasma treated lens surface, wherein said removable ink layer is comprised of urethane rubberized material;
 the removable ink layer forming clear and shaded areas on the lens surface;
 applying at least one base ink layer over at least a portion of the clear areas on the lens surface such that said shaded area is clear of said base ink layer; applying at least one colored ink layer over at least a portion of a base ink layer and not over any portion of said shaded area; and removing the removable ink layer;
 attaching the lens to a support frame.

2. The method for making camouflage eyeglasses of claim 1, wherein: said support frame is an eyeglasses frame.

* * * * *